(12) United States Patent
Ryu (10) Patent No.: US 9,043,629 B2
(45) Date of Patent: May 26, 2015

(54) MULTI-CLUSTER PROCESSING SYSTEM AND METHOD OF OPERATING THE SAME

(71) Applicant: SAMSUNG ELECTRONICS CO., LTD., Suwon-si (KR)

(72) Inventor: Eui-Youl Ryu, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

(21) Appl. No.: 13/798,681

(22) Filed: Mar. 13, 2013

(65) Prior Publication Data

US 2013/0339771 A1    Dec. 19, 2013

(30) Foreign Application Priority Data

Jun. 15, 2012  (KR) .................. 10-2012-0064450

(51) Int. Cl.
  *G06F 1/32*    (2006.01)
  *G06F 9/50*    (2006.01)

(52) U.S. Cl.
  CPC ............ *G06F 1/3228* (2013.01); *G06F 9/5094* (2013.01); *G06F 1/3293* (2013.01)

(58) Field of Classification Search
  CPC .............................. G06F 1/3228; G06F 1/3293
  USPC ....................................................... 713/323
  See application file for complete search history.

(56) References Cited

U.S. PATENT DOCUMENTS

| 7,353,362 | B2 | 4/2008 | Georgiou et al. |
| 7,503,039 | B2 | 3/2009 | Inoue et al. |
| 7,596,705 | B2 | 9/2009 | Kim |
| 7,636,863 | B2 | 12/2009 | Oh |
| 2004/0236912 | A1 | 11/2004 | Glasco |
| 2005/0033924 | A1 | 2/2005 | Glasco |
| 2008/0005591 | A1 | 1/2008 | Trautman et al. |
| 2009/0094437 | A1 | 4/2009 | Fukuda |

(Continued)

FOREIGN PATENT DOCUMENTS

| JP | 2009-193536 A | 8/2009 |
| KR | 10-2011-0049409 A | 5/2011 |
| KR | 10-1032873 B1 | 5/2011 |

OTHER PUBLICATIONS

Taliver Heath et al.; "Energy Conservation in Heterogenous Server Clusters"; Proceedings of the Tength ACM Sigplan Symposium on Principles and Practice of Parallel Programming; Jan. 1, 2005; pp. 186-195; XP55001666.

(Continued)

*Primary Examiner* — Albert Wang
(74) *Attorney, Agent, or Firm* — Sughrue Mion, PLLC (57) ABSTRACT

A multi-cluster processing system and a method of operating a multi-cluster processing system are provided. The multi-cluster processing system includes: a first cluster including a plurality of first-type cores: a second cluster including a plurality of second-type cores; and a control unit configured to monitor loads of the first-type cores and the second-type cores, wherein when utilization of at least one of enabled first-type cores exceeds a predetermined threshold utilization of each of the first-type cores, the control unit enables at least one of disabled first-type cores in a first mode, and the control unit enables at least one of the disabled second-type cores and disables the first cluster in a second mode, wherein an amount of computation per unit of time of each of the second-type cores is greater than an amount of computation per unit of time of each of the first-type cores.

18 Claims, 12 Drawing Sheets

(56) References Cited

U.S. PATENT DOCUMENTS

| | | |
|---|---|---|
| 2010/0299541 A1 | 11/2010 | Ishikawa et al. |
| 2011/0213950 A1* | 9/2011 | Mathieson et al. ............. 712/30 |
| 2011/0213998 A1* | 9/2011 | Mathieson et al. ........... 713/324 |
| 2011/0219246 A1 | 9/2011 | Arai |
| 2011/0246804 A1 | 10/2011 | Kaburlasos et al. |

OTHER PUBLICATIONS

Jeonghwan Choi et al.; "Profiling, Prediction, and Capping of Power Consumption in Consolidated Environments"; Modeling, Analysis and Simulation of Computers and Telecommunication Systems; IEEE International Symposium on IEEE; Sep. 8, 2008; 10 pages total; XP031415600.

Krishna Kant; "Supply and Demand Coordination in Energy Adaptive Computing"; Computer Communications and Networks (ICCCN); 2010 Proceedings of 19th International Conference on IEEE; Aug. 2, 2010; 6 pages total; XP031744430.

Zhe Wang et al.; "Thermal Constrained Workload Distribution for Maximizing Throughput on Multi-core Processors"; Green Computing Conference; International IEEE; Aug. 15, 2010; 8 pages total; XP031773130.

Enric Musoll; "Energy and Thermal Tradeoffs in Hardware-Based Load Balancing for Clustered Multi-Core Architectures Implementing Power Gating"; Application Specific Processors; Symposium on IEEE; Jun. 8, 2008; pp. 89-94; XP031289544.

Communication dated Dec. 4, 2014 issued by the European Patent Office in counterpart European Patent Application No. 13165421.2.

* cited by examiner

MULTI-CLUSTER PROCESSING SYSTEM AND METHOD OF OPERATING THE SAME

This application claims priority from Korean Patent Application No. 10-2012-0064450 filed on Jun. 15, 2012 in the Korean Intellectual Property Office, the disclosure of which is incorporated herein by reference in its entirety.

BACKGROUND

1. Field

Apparatuses and methods consistent with exemplary embodiments relate to multi-cluster processing.

2. Description of the Related Art

Increasing portability and performance of electronic devices have led to introduction of processors having a multi-cluster to reduce power consumption of the electronic devices.

An example model, which uses the multi-cluster, is a switching model. In the switching model, if power is supplied to all multi-cores included in the cluster during an operation, power consumption may be excessive.

SUMMARY

Aspects of one or more exemplary embodiments may provide a multi-cluster processing system, which has reduced power consumption during operation.

Aspects of one or more exemplary embodiments may also provide a method of operating a multi-cluster processing system, which has reduced power consumption during operation.

However, the inventive concept is not restricted to the aspects of the exemplary embodiments set forth herein. The above and other aspects of the exemplary embodiments will become more apparent to one of ordinary skill in the art to which the exemplary embodiments pertain by referencing the detailed description given below.

According to an aspect of an exemplary embodiments, there is provided a multi-cluster processing system comprising: a first cluster including a plurality of first-type cores; a second cluster comprising a plurality of second-type cores; and a control unit which enables at least one disabled first-type cores, among the first-type cores, when a first event occurs, and the control unit which disables all enabled first-type cores, among the first-type cores and enables at least one of the disabled second-type cores, when a second event occurs, different from the first event, wherein an amount of computation per unit of time of each of the second-type cores is greater than an amount of computation per unit of time of each of the first-type cores.

According to an aspect of another exemplary embodiments, there is provided a method of operating a multi-cluster processing system, the method including: providing a little cluster which includes n first cores and a big cluster which includes n second cores, where n is a natural number, disabling m first cores, among k enabled first cores, when a number of threads to be processed is reduced by m, where m is a natural number smaller than n, and m≤k<n; and disabling all of the k enabled first cores and enabling k second cores, among the n second cores, when utilization of one of the k enabled first cores exceeds a predetermined threshold utilization, wherein an amount of computation per unit of time of each of the n second cores is greater than an amount of computation per unit of time of each of the n first cores.

According to an aspect of still another exemplary embodiment, there is provided a multi-cluster processing system including: a first cluster including a plurality of first-type cores; a second cluster including a plurality of second-type cores; a policy determining unit which determines a policy based on one of a low power scheduling policy and a high power scheduling policy, and outputs the determined policy; and a power management unit which enables or disables the first-type cores and the second-type cores based on the determined policy received from the policy determining unit, wherein an amount of computation per unit of each of the second-type cores is greater than an amount of computation per unit of each of the first-type cores.

BRIEF DESCRIPTION OF THE DRAWINGS

The above and other aspects of the exemplary embodiments will become more apparent with reference to the attached drawings, in which.

DETAILED DESCRIPTION OF THE EXEMPLARY EMBODIMENTS

Advantages and features of the inventive concept may be understood more readily by reference to the following detailed description of the exemplary embodiments and the accompanying drawings. The inventive concept may, however, be embodied in many different forms and should not be construed as being limited to the exemplary embodiments set forth herein. Rather, these embodiments are provided so that this disclosure will be thorough and complete and will fully convey the inventive concept to those skilled in the art, and the inventive concept will only be defined by the appended claims. In the drawings, the thickness of layers and regions are exaggerated for clarity.

The use of the terms "a," "an," "the," and similar references in the context of describing the exemplary embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the exemplary embodiments.

The term "unit" or "module", as used herein, means, but is not limited to, a software or hardware component, such as a field programmable gate array (FPGA) or an application specific integrated circuit (ASIC), which performs certain tasks. A unit or module may advantageously be configured to reside in the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules Unless defined otherwise, all technical and scientific terms used herein have the same meaning as commonly understood by one of ordinary skill in the art to which the exemplary embodiments belong. It is noted that the use of any and all examples, or exemplary terms provided herein is intended merely to better illuminate the exemplary embodiments and is not a limitation on the scope of the inventive concept unless otherwise specified. Further, unless defined otherwise, all terms defined in generally used dictionaries may not be overly interpreted.

Figure 1:
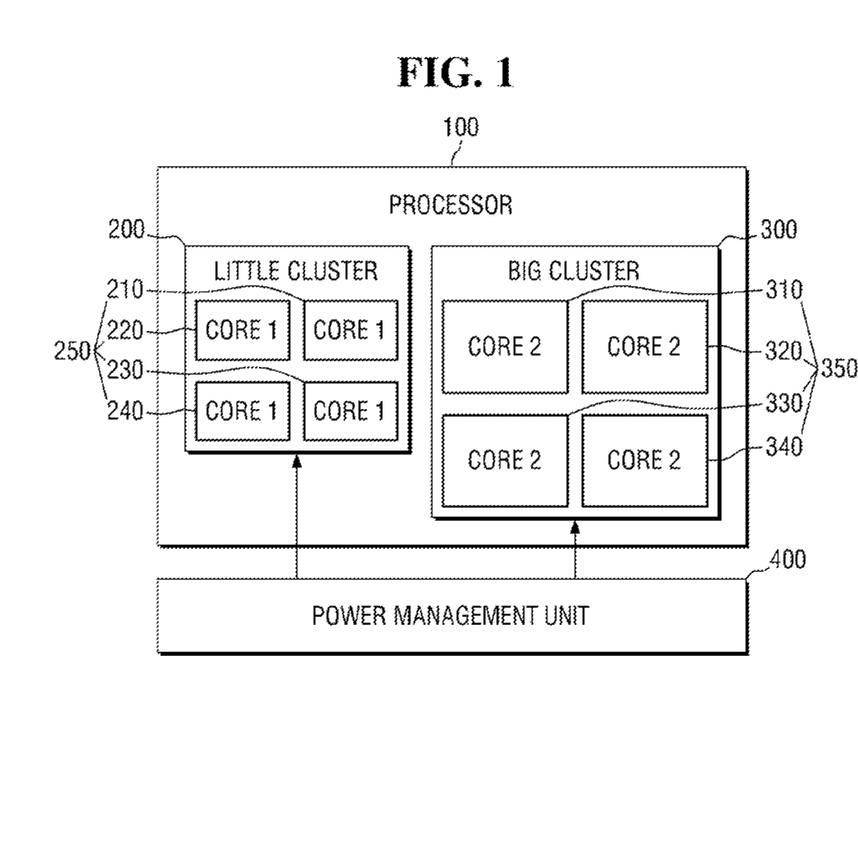
FIG. 1 is a conceptual block diagram of a multi-cluster processing system according to an exemplary embodiment.

FIG. 1 is a conceptual block diagram of a multi-cluster processing system according to an exemplary embodiment.

Referring to FIG. 1, the multi-cluster processing system includes a first cluster 200, a second cluster 300, and a control unit 400.

The first cluster 200 may be disposed within a processor 100. The first cluster 200 may include n (in is a natural number) first cores 250. In the present specification, for ease of description, a case where the first cluster 200 includes four (i.e., n=4) first cores 210 through 240 will be described as an example. However, embodiments are not limited to this case.

The second cluster 300 may also be disposed within the processor 100 and include n second cores 350. The first cluster 200 and the second cluster 300 can be disposed in a single chip. As shown in FIG. 1, the second cluster 300 may be separated from the first cluster 200. For ease of description, a case where the second cluster 300 includes four (i.e., n=4) second cores 310 through 340 will be described as an example. However, embodiments are not limited to this case.

In FIG. 1, the number of the first cores 250 included in the first cluster 200 is equal to the number of the second cores 350 included in the second cluster 300. However, embodiments are not limited thereto. In some embodiments, the number of the first cores 250 included in the first cluster 200 may be different from the number of the second cores 350 included in the second cluster 300.

In addition, in FIG. 1, only the first cluster 200 and the second cluster 300 are disposed within the processor 100. However, embodiments are not limited thereto. A third cluster (not shown) including third cores (not shown) may also be disposed within the processor 100 to be separated from the first and second clusters 200 and 300.

In the current embodiment, the first cluster 200 may be, e.g., a little cluster, and the second cluster 300 may be, e.g., a big cluster. In other words, the amount of computation per unit of time of each of the first cores 250 included in the first cluster 200 may be smaller than the amount of computation per unit of time of each of the second cores 350 included in the second cluster 300. Therefore, the amount of computation time may be smaller when all first cores 250 included in the first cluster 200 are enabled to perform operations than when all second cores 350 included in the second cluster 300 are enabled to perform operations. Further, embodiments may also make each of the first cores 250, included in the first cluster 200, consume less power than each of the second cores 350, included in the second cluster 300.

In the current embodiment, $(1\text{-}1)^{th}$ through $(1\text{-}4)^{th}$ cores 210 through 240 included in the first cluster 200 may perform the same amount of computation per unit of time, and $(2\text{-}1)^{th}$ through $(2\text{-}4)^{th}$ cores 310 through 340 included in the second cluster 300 may perform the same amount of computation per unit of time. For example, if the amount of computation per unit of time of each of the $(1\text{-}1)^{th}$ through $(1\text{-}4)^{th}$ cores 210 through 240 is 10, the amount of computation per unit of time of each of the $(2\text{-}1)^{th}$ through $(2\text{-}4)^{th}$ cores 310 through 340 may be 40). Based on this assumption, the operation of the multi-cluster processing system according to the current embodiment will hereinafter be described. However, embodiments are not limited to this assumption. Although not included in the following description, features that can be readily modified by those of ordinary skill in the art to which the embodiments pertain may be included in the scope of the embodiments.

The control unit 400 may enable or disable the first cluster 200 and the second cluster 300 as desired. Specifically, when an operation needs to be performed by the first cluster 200, the control unit 400 may enable the first cluster 200 and disable the second cluster 300. Conversely, when an operation needs to be performed by the second cluster 300, the control unit 400 may enable the second cluster 300 and disable the first cluster 200. In addition, when a required amount of computation can be fully processed by the $(1\text{-}1)^{th}$ core 210 of the first cluster 200, the control unit 400 may enable the first cluster 200 and disable the second cluster 300. Even within the first cluster 200, the control unit 400 may enable the $(1\text{-}1)^{th}$ core 210 and disable the $(1\text{-}2)^{th}$ through $(1\text{-}4)^{th}$ cores 220 through 240. In other words, the control unit 400, according to the current embodiment, may determine whether to enable the entire first cluster 200 and the entire second cluster 300. Also, the control unit 400 may determine whether to enable each of the $(1\text{-}1)^{th}$ through $(1\text{-}4)^{th}$ cores 210 through 240 included in the first cluster 200 and each of the $(2\text{-}1)^{th}$ through $(2\text{-}4)^{th}$ cores 310 through 340 included in the second cluster 300.

In some embodiments, as shown in the drawing, the control unit 400 may be, for example, a power management unit. In other words, when the control unit 400, according to the current embodiment, enables the first and second clusters 200 and 300 and/or the cores 210 through 240 and 310 through 340 included in the first and second clusters 200 and 300, it may denote that the control unit 400 operates the first and second clusters 200 and 300 and/or the cores 210 through 240 and 310 through 340 included in the first and second clusters 200 and 300 by supplying power to them. In addition, when the control unit 400 disables the first and second clusters 200 and 300 and/or the cores 210 through 240 and 310 through 340 included in the first and second clusters 200 and 300, it may denote that the control unit 400 inactivates the operation of the first and second clusters 200 and 300 and/or the cores 210 through 240 and 310 through 340 included in the first and second clusters 200 and 300 by shutting off the power supply. A case where the control unit 400, according to the current embodiment, is a power management unit will hereinafter be described. However, embodiments are not limited to this case, and the configuration of the control unit 400 can be changed as desired. Although not shown in the drawing, in some embodiments, the control unit 400 may enable or disable the first and second clusters 200 and 300 and/or the cores 210 through 240 and 310 through 340 included in the first and second clusters 200 and 300 by transmitting an enable signal or a disable signal to them.

Hereinafter, the operation of the multi-cluster processing system shown in FIG. 1 will be described with reference to FIGS. 2 through 6.

Figure 2:
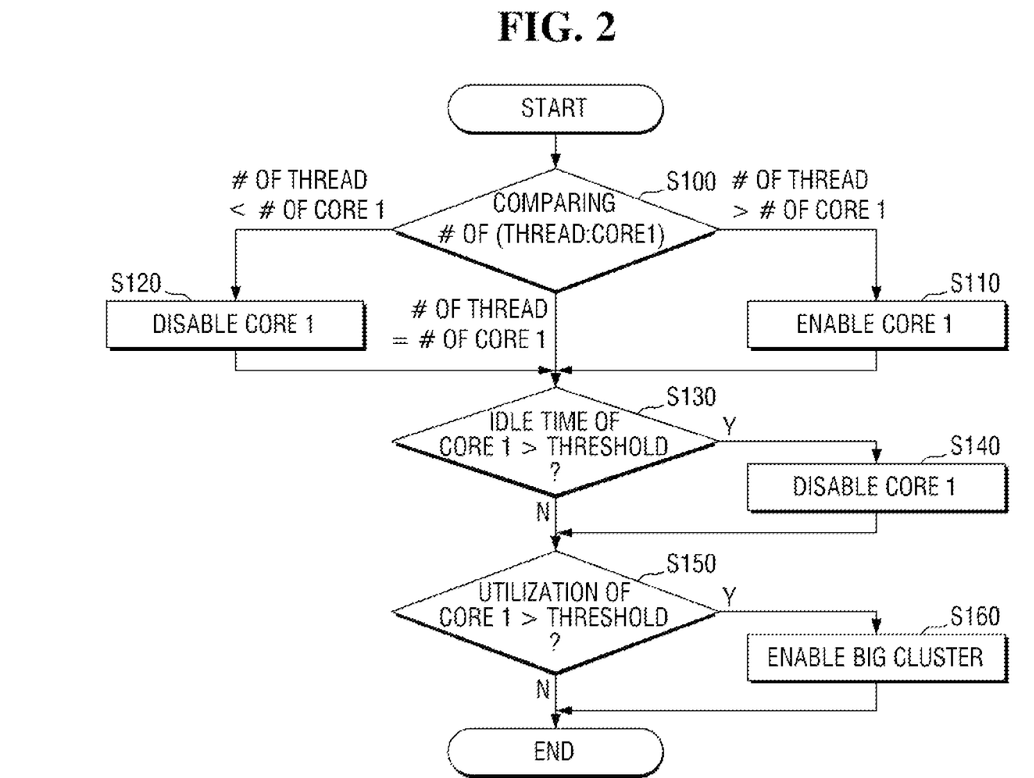
FIG. 2 is a flowchart illustrating the operation of the multi-cluster processing system shown in FIG. 1, according to an exemplary embodiment.

FIG. 2 is a flowchart illustrating the operation of the multi-cluster processing system shown in FIG. 1. FIGS. 3 through 6 are diagrams illustrating the operation of the multi-cluster processing system shown in FIG. 1.

For an easier description of operating characteristics of the multi-cluster processing system according to the current embodiment, the multi-cluster processing system may be assumed to initially be in such a state that the $(1-1)^{th}$ core 210 and the $(1-2)^{th}$ core 220 included in the first cluster 200 are enabled while the $(1-3)^{th}$ core 230 and the $(1-4)^{th}$ core 240 included in the first cluster 200 and the $(2-1)^{th}$ through $(2-4)^{th}$ cores 310 through 340 included in the second cluster 300 are disabled. However, this is merely an example. As long as one of ordinary skill in the art to which the embodiments pertain understand the technical spirit of the embodiments described below, they can made any modifications to this example.

Referring to FIG. 2, the number of threads to be processed is compared with the number of enabled first cores (operation S100). When the number of the threads to be processed is greater than the number of the enabled first cores, an additional first core is enabled (operation S110).

Figure 3:
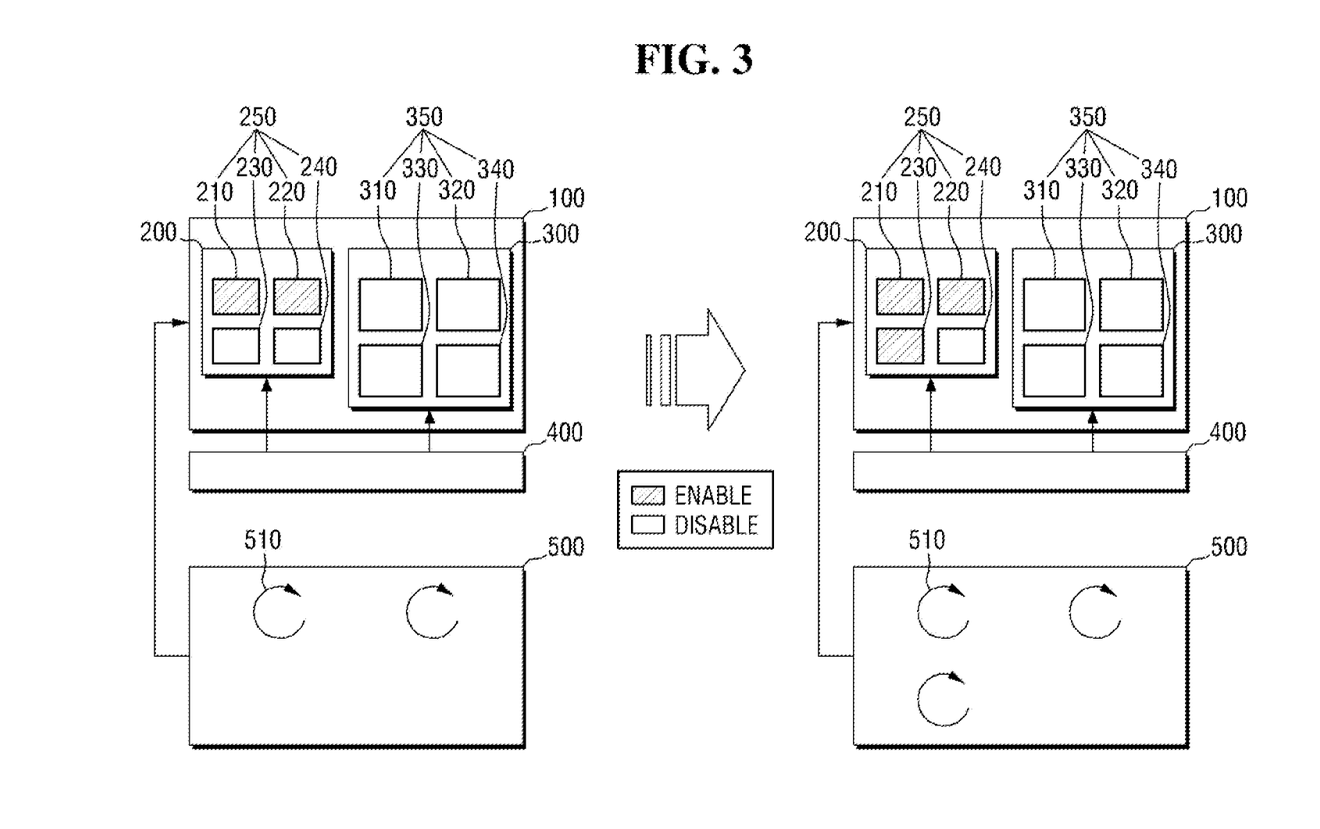
FIGS. 3 through 6 are diagrams illustrating the operation of the multi-cluster processing system shown in FIG. 1, according to an exemplary embodiment.

Specifically, referring to FIG. 3, when the number of threads 510 to be processed, which are provided by a kernel 500, is two and when the number of enabled first cores 250 is two (the $(1-1)^{th}$ core 210 and the $(1-2)^{th}$ core 220) (see the left side of the drawing), since the enabled $(1-1)^{th}$ core 210 and the enabled $(1-2)^{th}$ core 220 can process the threads 510, respectively, the control unit 400 takes no action. However, when the number of the threads 510 to be processed, which are provided the kernel 500, is three (see the right side of the drawing), since the number of the enabled first cores 250 is smaller than the number of the threads 510 to be processed, the control unit 400 may additionally enable the $(1-3)^{th}$ core 230 included in the first cluster 200, so that the enabled $(1-3)^{th}$ core 230 processes a corresponding thread. In FIG. 3, the $(1-3)^{th}$ core 230 is enabled. However, embodiments are not limited thereto. When necessary, the control unit 400 may enable the $(1-4)^{th}$ core 240 instead of the $(1-3)^{th}$ core 230).

Referring back to FIG. 2, the result of comparing the number of the threads to be processed with the number of the enabled first cores (operation S100) indicates that the number of the threads to be processed is smaller than the number of the enabled first cores, an unnecessarily enabled first core is disabled (operation S120).

Figure 4:
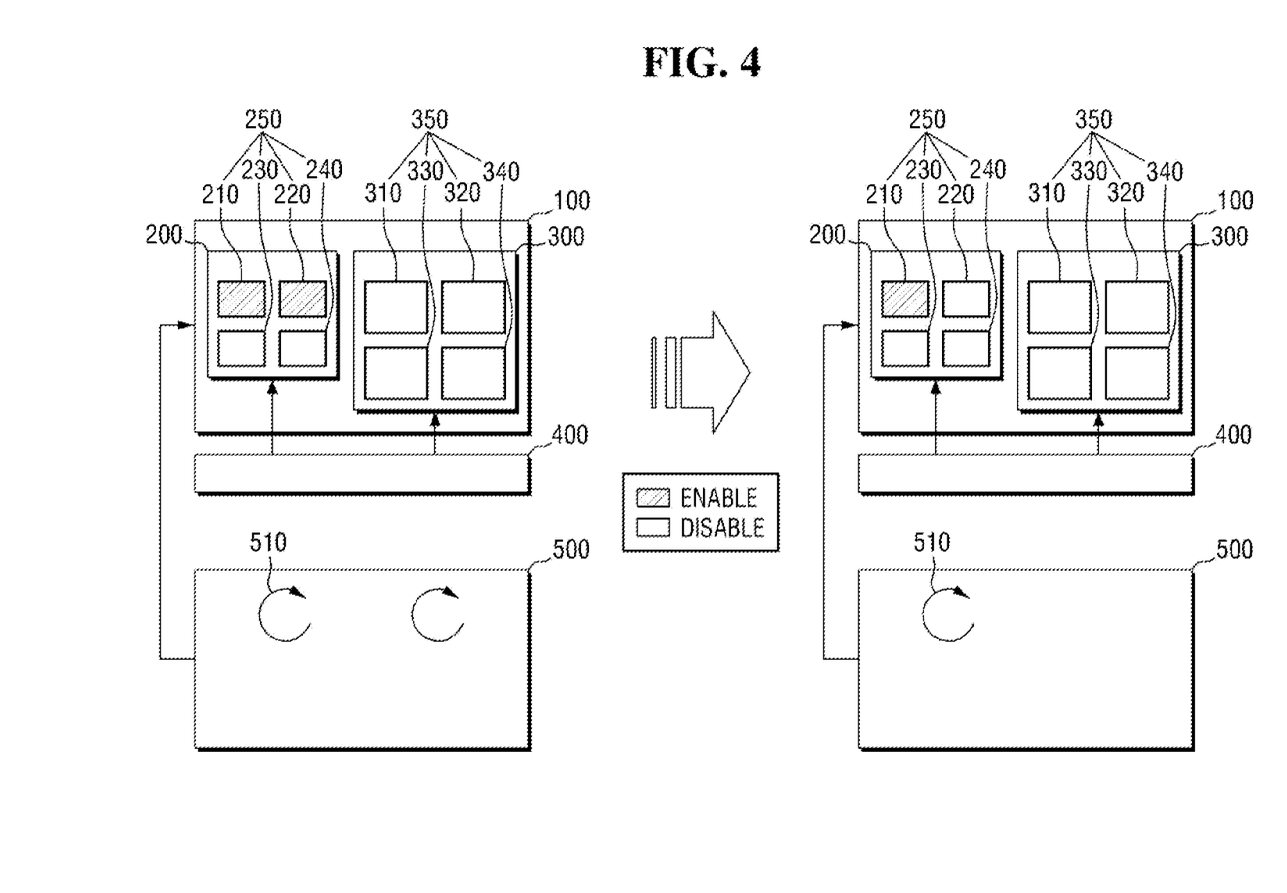

Specifically, referring to FIG. 4, when the number of the threads 510 to be processed, which are provided by the kernel 500, is two and when the number of the enabled first cores 250 is two (the $(1-1)^{th}$ core 210 and the $(1-2)^{th}$ core 220) (see the left side of the drawing), since the enabled $(1-1)^{th}$ and $(1-2)^{th}$ cores 210 and 220 can process the threads 510 to be processed, respectively, the control unit 400 takes no action. However, when the number of the threads 510 to be processed, which are provided by the kernel 500, is one (see the right side of the drawing), since the number of the enabled first cores 250 is greater than the number of the threads 510 to be processed, the control unit 400 disables the unnecessarily enabled $(1-2)^{th}$ core 220 among the enabled $(1-1)^{th}$ and $(1-2)^{th}$ core 210 and 220. In FIG. 4, the $(1-2)^{th}$ core 220 is disabled. However, embodiments are not limited thereto. When necessary, the control unit 400 may disable the $(1-1)^{th}$ core 210 instead of the $(1-2)^{th}$ core 220.

Referring back to FIG. 2, it is detected whether an idle time of each of the first cores exceeds a predetermined threshold time (operation S130). When it is detected that there is a first core whose idle time exceeds the predetermined threshold time, the first core is disabled (operation S140).

Figure 5:
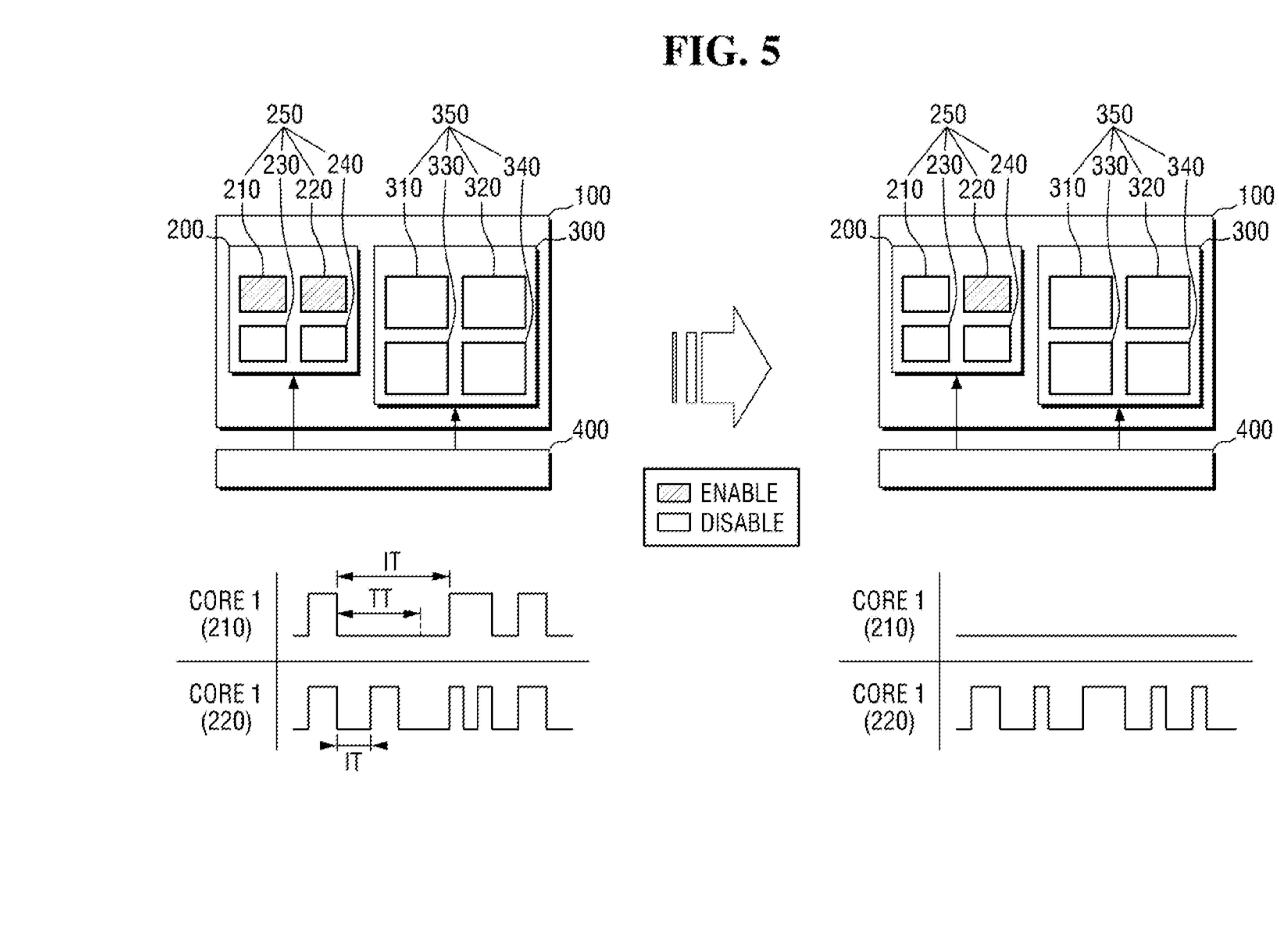

Specifically, referring to FIG. 5, an idle time IT of the $(1-1)^{th}$ core 210 includes a section which exceeds a threshold time TT, but an idle time IT of the $(1-2)^{th}$ core 220 does not include a section which exceeds the threshold time TT (see the left side of the drawing). This may indicate that the amount of computation required to be processed is not so large to enable both the $(1-1)^{th}$ core 210 and the $(1-2)^{th}$ core 220. Therefore, the control unit 400 may disable the $(1-1)^{th}$ core 210 whose idle time IT includes the section which exceeds the threshold time TT (see the right side of the drawing). Thus, an operation being performed by the $(1-1)^{th}$ core 210 may be performed by, e.g., the enabled $(1-2)^{th}$ core 220.

Referring back to FIG. 2, it is detected whether utilization of each of the enabled first cores exceeds predetermined threshold utilization (operation S150). When it is detected that there is a first core whose utilization exceeds the predetermined threshold utilization, a second cluster is enabled (operation S160).

Figure 6:
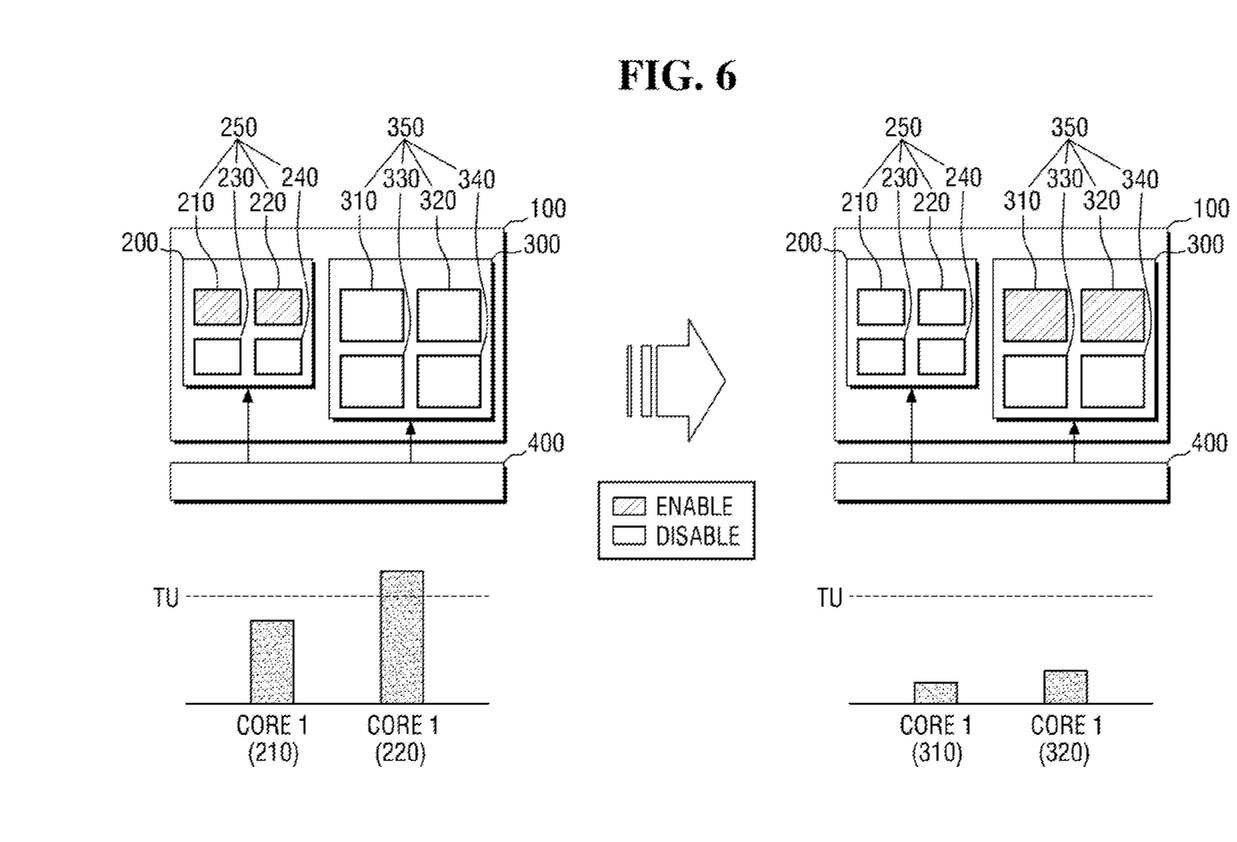

Specifically, referring to FIG. 6, utilization of the enabled $(1-1)^{th}$ core 210 does not exceed threshold utilization TU, but utilization of the enabled $(1-2)^{th}$ core 220 exceeds the threshold utilization TU (see the left side of the drawing). In this case, the control unit 400 disables the first cluster 200 and enables the second cluster 300, so that the second cluster 300 continues to perform an operation being performed by the first cluster 200. Specifically, the control unit 400 disables the enabled $(1-1)^{th}$ and $(1-2)^{th}$ cores 210 and 220 of the first cluster 200 and enables the $(2-1)^{th}$ and $(2-2)^{th}$ cores 310 and 320 of the second cluster 300. As a result, the first cluster 200 is disabled, and the second cluster 300 is enabled.

In the current embodiment, when enabling the second cluster 300, the control unit 400 may enable a number of the second cores 350 equal to the number of the enabled first cores 250. In other words, the control unit 400 may enable not all of the second cores 350 included in the second cluster 300 but may enable a number of the second cores 350 corresponding to the number of the enabled first cores 250. In the example of FIG. 6, the $(1-1)^{th}$ and $(1-2)^{th}$ cores 210 and 220 of the first cluster 200 have been enabled and are performing operations. Thus, the control unit 400 disables the $(1-1)^{th}$ core 210 and the $(1-2)^{th}$ core 220. In addition, the control unit 400 may enable only the $(2-1)^{th}$ core 310 and the $(2-2)^{th}$ core 320 while the $(2-3)^{th}$ and $(2-4)^{th}$ cores 330 and 340 of the second cluster 300 remain disabled. In the current embodiment, the amount of computation per unit of time of each of the $(2-1)^{th}$ core 310 and the $(2-2)^{th}$ core 320 is greater (e.g., four times greater) than the amount of computation per unit of time of each of the $(1-1)^{th}$ core 210 and the $(1-2)^{th}$ core 220. Therefore, it can be understood that the utilization of each of the $(2-1)^{th}$ core 310 and the $(2-2)^{th}$ core 320 does not exceed the threshold utilization TU.

In summary, the control unit 400 of the multi-cluster processing system, according to the current embodiment, determines whether to enable or disable the first cores 250 included in the first cluster 200 in view of the number of threads to be processed and the idle time of each of enabled first cores 250. In addition, the control unit 400 determines whether to enable or disable the first cluster 200 and the second cluster 300 in view of the utilization of each of the enabled first cores 250. When disabling the first cluster 200 and enabling the second cluster 300, the control unit 400 enables a number of the second cores 350 equal to the number of the enabled first cores 250. As described above, the multi-cluster processing system, according to the current embodiment, enables and operates only a required number of the first cores 250 or the second cores 350 to process the required computation amount. Therefore, the multi-cluster processing system can avoid an unnecessary waste of power, thereby reducing power consumption during operation.

Hereinafter, a multi-cluster processing system, according to another embodiment, will be described with reference to FIG. 7.

Figure 7:
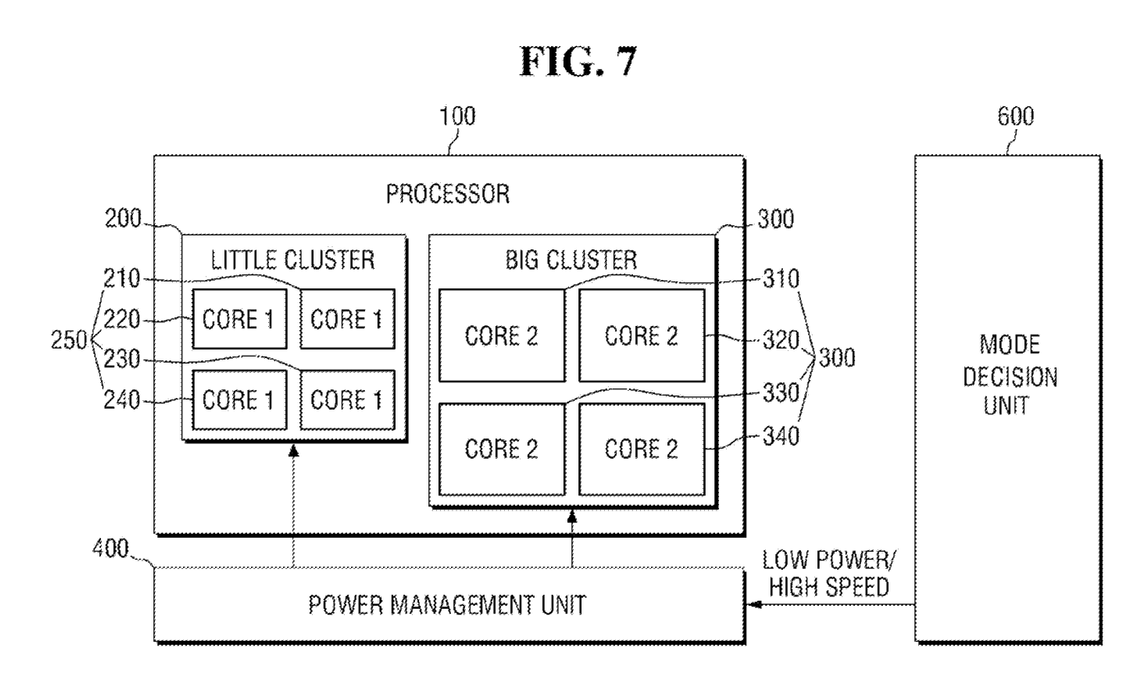
FIG. 7 is a conceptual block diagram of a multi-cluster processing system according to another exemplary embodiment.

FIG. 7 is a conceptual block diagram of a multi-cluster processing system according to another embodiment.

Referring to FIG. 7, the multi-cluster processing system includes a first cluster 200, a second cluster 300, a control unit 400, and a mode decision unit 600.

The first cluster 200 may be disposed within a processor 100. The first cluster 200 may include n (n is a natural number) first cores 250. For ease of description, a case where the first cluster 200 includes four (i.e., n=4) first cores 210 through 240 will be described.

The second cluster 300 may also be disposed within the processor 100 and include n second cores 350. As shown in FIG. 7, the second cluster 300 may be separated from the first cluster 200. For ease of description, a case where the second cluster 300 includes four (i.e., n=4) second cores 310 through 340 will be described. However, in some embodiments, the number of the first cores 250 included in the first cluster 200 may be different from the number of the second cores 350 included in the second cluster 300.

In the current embodiment, as described above, the first cluster 200 may be, e.g., a little cluster, and the second cluster 300 may be, e.g., a big cluster. Therefore, the amount of computation per unit of time of each of the first cores 250 included in the first cluster 200 may be smaller than the amount of computation per unit of time of each of the second cores 350 included in the second cluster 300. Here, $(1-1)^{th}$ through $(1-4)^{th}$ cores 210 through 240 included in the first cluster 200 may perform the same amount of computation per unit of time, and $(2-1)^{th}$ through $(2-4)^{th}$ cores 310 through 340 included in the second cluster 300 may perform the same amount of computation per unit of time.

The control unit 400 may enable or disable the first cluster 200 and the second cluster 300 as desired. Specifically, the control unit 400 may determine whether to enable the entire first cluster 200 and the entire second cluster 300. Also, the control unit 400 may determine whether to enable each of the $(1-1)^{th}$ through $(1-4)^{th}$ cores 210 through 240 included in the first cluster 200 and each of the $(2-1)^{th}$ through $(2-4)^{th}$ cores 310 through 340 included in the second cluster 300. In the current embodiment, as shown in the drawing, the control unit 4100 may be, for example, a power management unit. However, in some other embodiments, the control unit 400 may be modified to enable or disable the first and second clusters 200 and 300 and/or the cores 210 through 240 and 310 through 340 included in the first and second clusters 200) and 300 by transmitting an enable signal or a disable signal to them.

The control unit 400, according to the current embodiment, may control the first cluster 200 and the second cluster 300 in different ways according to a mode determined by the mode decision unit 600. In other words, the operation of the control unit 400, when the mode determined by the mode decision unit 600 is a low power scheduling mode LOW POWER for minimizing power consumption, may be different from the operation of the control unit 400, when the mode determined by the mode decision unit 600 is a high performance scheduling mode HIGH SPEED for maximizing system performance.

The mode decision unit 600 may determine the mode of the multi-cluster processing system. Specifically, the mode decision unit 600 may determine any one of the low power scheduling mode LOW POWER, for minimizing power consumption, and the high performance scheduling mode HIGH SPEED, for maximizing system performance. The mode determined by the mode decision unit 600 may change in real time, according to the system operating environment, or may be fixed by a user at the initial operation of the multi-cluster processing system.

Hereinafter, the operation of the multi-cluster processing system shown in FIG. 7 will be described with reference to FIGS. 8 through 11.

Figure 8:
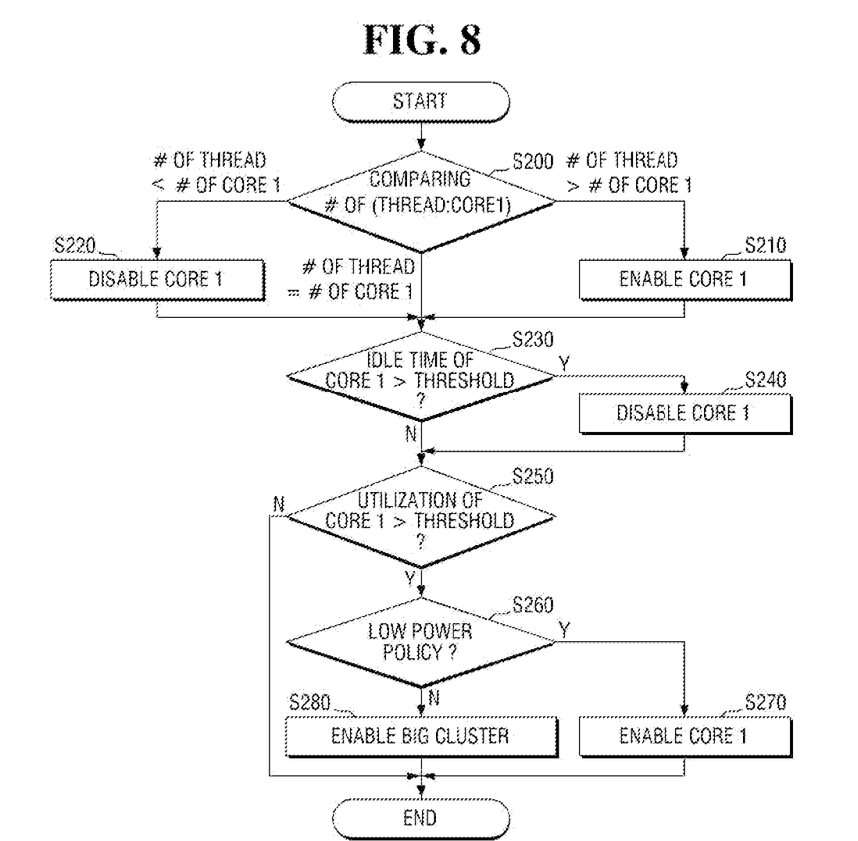
FIG. 8 is a flowchart illustrating the operation of the multi-cluster processing system shown in FIG. 7, according to an exemplary embodiment.
Figure 9:
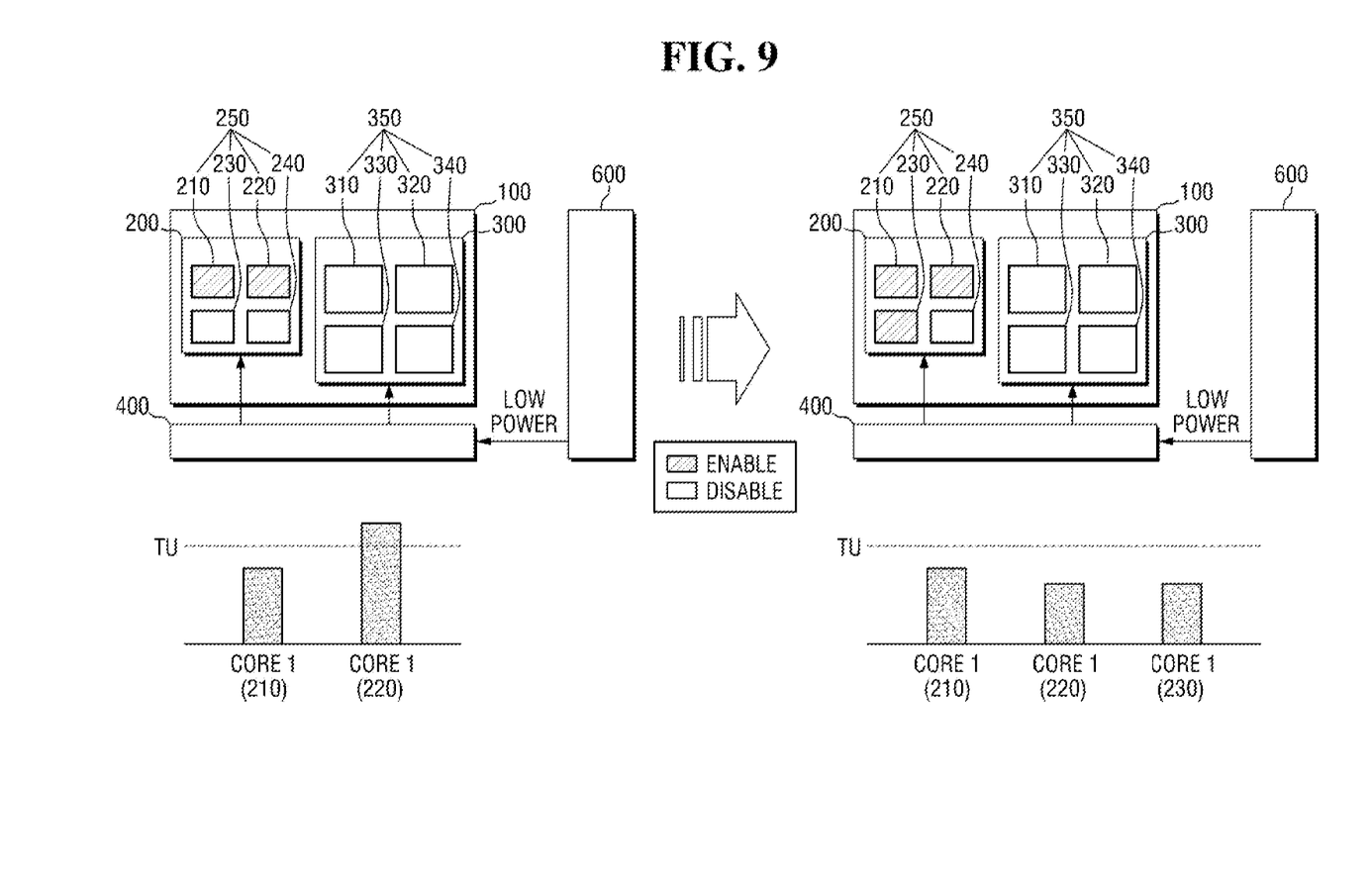
FIGS. 9 through 11 are diagrams illustrating the operation of the multi-cluster processing system shown in FIG. 7, according to exemplary embodiments.
Figure 10:
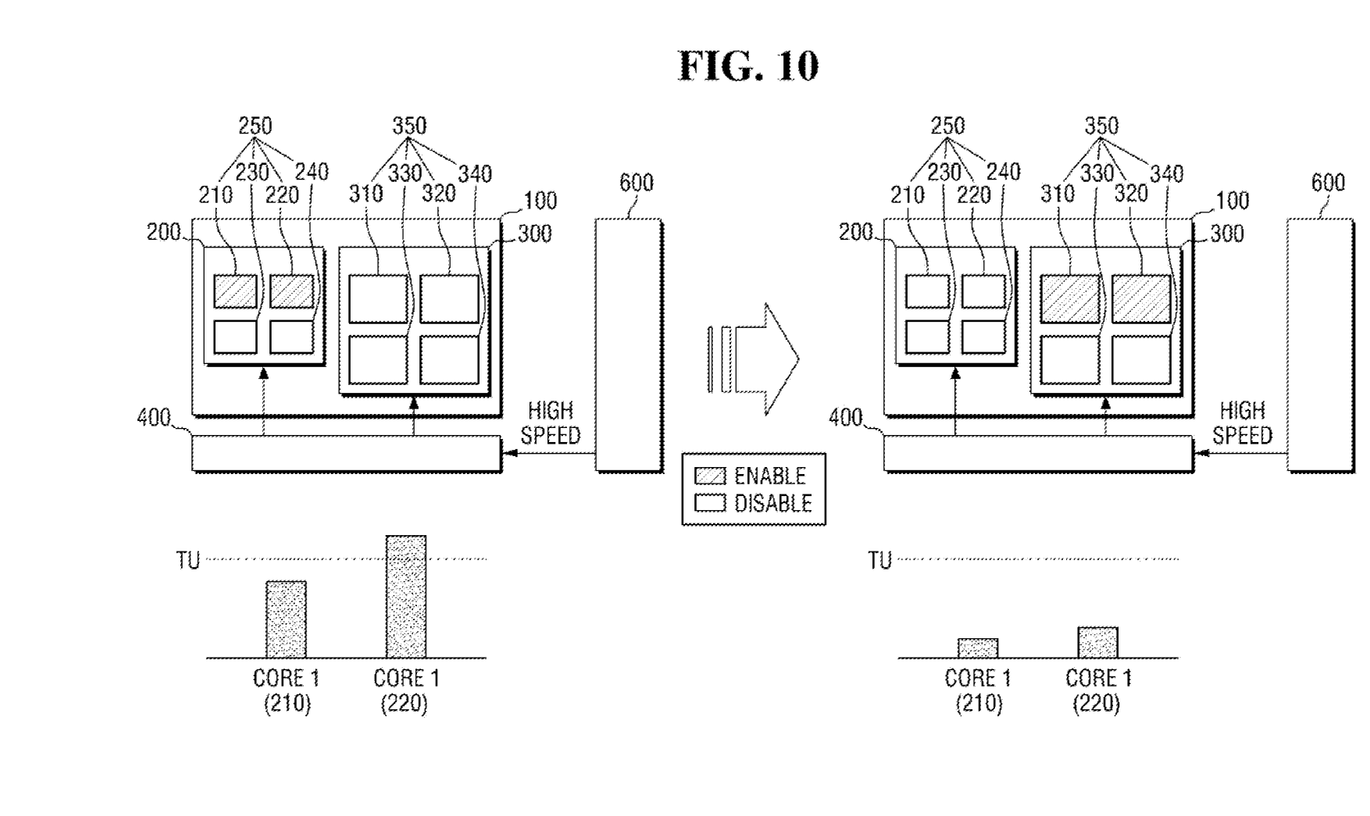
Figure 11:
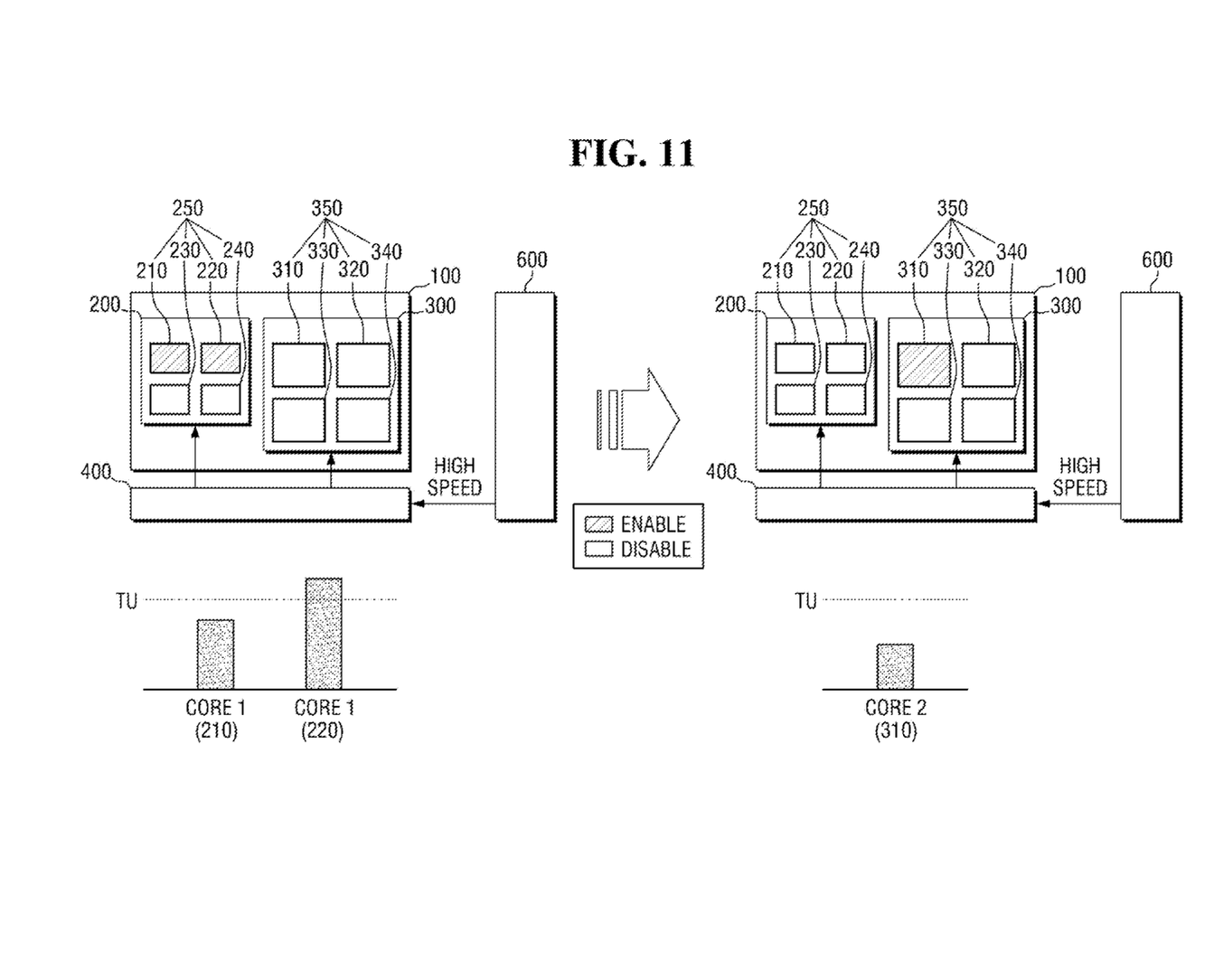

FIG. 8 is a flowchart illustrating the operation of the multi-cluster processing system shown in FIG. 7. FIGS. 9 through 11 are diagrams illustrating the operation of the multi-cluster processing system shown in FIG. 7.

For an easier description of operating characteristics of the multi-cluster processing system according to the current embodiment, the multi-cluster processing system may be assumed to initially be in such a state that the $(1-1)^{th}$ core 210 and the $(1-2)^{th}$ core 220 included in the first cluster 200 are enabled while the $(1-3)^{th}$ core 230 and the $(1-4)^{th}$ core 240 included in the first cluster 200 and the $(2-1)^{th}$ through $(2-4)^{th}$ cores 310 through 340 included in the second cluster 300 are disabled. However, this is merely an example. As long as one of ordinary skill in the art to which the embodiments pertain understands the technical spirit of the embodiments described below, they can make any modifications to this example.

Referring to FIG. 8, the number of threads to be processed is compared with the number of enabled first cores (operation S200). When the number of the threads to be processed is greater than the number of the enabled first cores, an additional first core is enabled (operation S210). Conversely, when the number of the threads to be processed is smaller than the number of the enabled first cores, an unnecessarily enabled first core is disabled (operation S220). The operation of the multi-cluster processing system, according to the previous embodiment, has already been described. Thus, a repetitive description thereof will be omitted.

Referring to FIG. 8, it is detected whether an idle time of each of the first cores exceeds a predetermined threshold time (operation S230). When it is detected that there is a first core whose idle time exceeds the predetermined threshold time, the first core is disabled (operation S240). The operation of the multi-cluster processing system, according to the previous embodiment, has already been described. Thus, a repetitive description thereof will be omitted.

Referring to FIG. 8, it is detected whether utilization of each of the enabled first cores exceeds predetermined threshold utilization (operation S250). When it is detected that there is a first core whose utilization exceeds the predetermined threshold utilization, a determined mode is identified (operation S260). When the determined mode is a low power scheduling mode, an additional first core is enabled to reduce the utilization of the first core which exceeds the predetermined threshold utilization (operation S270).

Specifically, referring to FIG. 9, utilization of the enabled $(1-1)^{th}$ core 210 does not exceed threshold utilization TU, but utilization of the enabled $(1-2)^{th}$ core 220 exceeds the threshold utilization TU. Here, a mode determined by the mode decision unit 600 is a low power scheduling mode LOW POWER (see the left side of the drawing).

In this case, the control unit 400, according to the current embodiment, may not disable the first cluster 200 or enable the second cluster 300. Instead, the control unit 400 may additionally enable a first core 250 included in the first cluster 200. In FIG. 9, the $(1\text{-}3)^{th}$ core 230 is additionally enabled (see the right side of the drawing). The enabled $(1\text{-}3)^{th}$ core 230 performs part of an operation being performed by the $(1\text{-}2)^{th}$ core 220. As a result, the utilization of the $(1\text{-}2)^{th}$ core 220 does not exceed the threshold utilization TU.

In other words, when the operation mode of the multi-cluster processing system is the low power scheduling mode LOW POWER, the control unit 400 operates the multi-cluster processing system by additionally enabling a first core 250, which consumes less power than a second core 350, since the amount of computation per unit of time of the first core 250 is smaller than that of the second core 350.

Referring back to FIG. 8, when it is identified in operation S260 that the determined mode is a high performance scheduling mode, a first cluster is disabled to reduce the utilization of the first core which exceeds the predetermined threshold utilization, and a second cluster is enabled (operation S280).

Specifically, referring to FIG. 10, the utilization of the enabled $(1\text{-}1)^{th}$ core 210 does not exceed the threshold utilization TU, but the utilization of the enabled $(1\text{-}2)^{th}$ core 220 exceeds the threshold utilization TU. Here, the mode determined by the mode decision unit 600 is a high performance scheduling mode HIGH SPEED (see the left side of the drawing). In this case, the control unit 400, according to the current embodiment, may disable the first cluster 200 and enable the second cluster 300, so that the second cluster 300 continues to perform an operation being performed by the first cluster 200. In other words, the control unit 400 disables the enabled $(1\text{-}1)^{th}$ and $(1\text{-}2)^{th}$ cores 210 and 220 of the first cluster 200 and enables the $(2\text{-}1)^{th}$ and $(2\text{-}2)^{th}$ cores 310 and 320 of the second cluster 300 while the $(2\text{-}3)^{th}$ and $(2\text{-}4)^{th}$ cores 330 and 340 of the second cluster 300 remain disabled. In other words, when enabling the second cluster 300, the control unit 400 may enable a number of the second cores 350 equal to the number of the enabled first cores 250. In summary, when the operation mode of the multi-cluster processing system is the high performance scheduling mode HIGH SPEED, the control unit 400 operates the multi-cluster processing system by enabling the second cores 350 which can operate at higher speed than the first cores 250, since the amount of computation per unit of time of each of the second cores 350 is greater than that of each of the first cores 250.

In some embodiments, the control unit 400 may operate in a different way than FIG. 10. Specifically, referring to FIG. 11, when the utilization of the enabled $(1\text{-}2)^{th}$ core 220 exceeds the threshold utilization TU and when the mode determined by the mode decision unit 600 is the high performance scheduling mode HIGH SPEED (see the left side of the drawing) as in FIG. 10, the control unit 400 may disable the first cluster 200 and enable the second cluster 300. Here, the control unit 400 may enable only a required number of the second cores 350, to process the amount of computation being performed by the first cluster 200 (see the right side of the drawing).

As shown in FIG. 11, when determining that the amount of computation being performed by the $(1\text{-}1)^{th}$ core 210 and the $(1\text{-}2)^{th}$ core 220 can be performed by the $(2\text{-}1)^{th}$ core 310 alone (when determining that the amount of computation per unit of time of the $(2\text{-}1)^{th}$ core 310 is greater than the sum of the amount of computation per unit of time of the $(1\text{-}1)^{th}$ core 210 and the amount of computation per unit of time of the $(1\text{-}2)^{th}$ core 220), the control unit 400 may disable the enabled $(1\text{-}1)^{th}$ and $(1\text{-}2)^{th}$ cores 210 and 220 of the first cluster 200 and enable only the $(2\text{-}1)^{th}$ core 310 while the $(2\text{-}2)^{th}$ through $(2\text{-}4)^{th}$ cores 320 through 340 of the second cluster 300 remain disabled.

As described above, the multi-cluster processing system, according to the current embodiment, enables and operates only a required number of the first cores 250 or the second cores 350 to process the amount of computation required based on the determined system mode. Therefore, the multi-cluster processing system can avoid an unnecessary waste of power, thereby reducing power consumption during operation.

Figure 12:
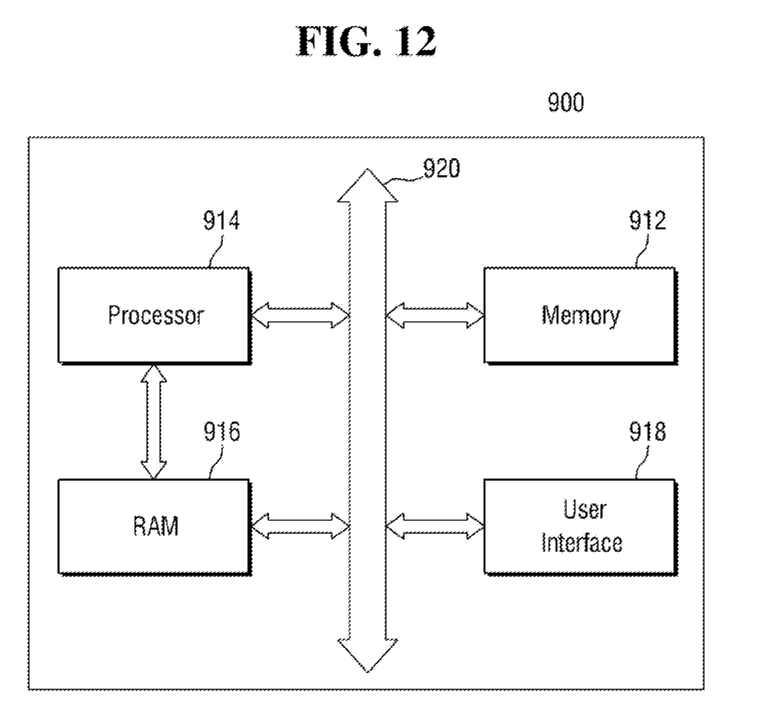
FIG. 12 is a block diagram of an electronic system to which a multi-cluster processing system, according to any one of the above exemplary embodiments is applied.

FIG. 12 is a block diagram of an electronic system 900 to which a multi-cluster processing system is applied, according to any one of the above-described embodiments.

Referring to FIG. 12, the electronic system 900 may be a mobile device, a computer, etc. The electronic system 900 may include a memory system 912, a processor system 914, a random access memory (RAM) 916, and a user interface 918. The memory system 912, the processor 914, the RAM 916, and the user interface 918 may perform data communication with each other using a bus 920.

The processor system 914 may execute programs and control the electronic system 900. The multi-cluster processing system, according to any one of the above-described embodiments, can be employed in the processor system 914.

The RAM 916 can be used as an operation memory of the processor system 914. In some embodiments, the processor system 914 and the RAM 916 may be included in one package.

The user interface 918 may be used to input or output data to/from the electronic system 900. When the multi-cluster processing system, according to any one of the above-described embodiments, is employed in the processor system 914, a user may determine a mode of the multi-cluster processing system (e.g., a low power scheduling mode or a high performance scheduling mode) through the user interface 918.

The memory system 912 may store codes for operating the processor system 914, data processed by the processor system 914, or data input from an external source. The memory system 912 may include a controller and a memory and may be configured as a memory card.

The electronic system 900 can be applied to electronic controllers of various electronic devices. For example, the electronic system 900 can be applied to a mobile system, a personal computer, an industrial computer, or a logic system performing various functions. For example, the mobile system may be any one of a personal digital assistant (PDA), a portable computer, a web tablet a mobile phone, a wireless phone, a laptop computer, a memory card, a digital music system, and an information transmission/reception system. When the electronic system 900 is equipment that can perform wireless communication, it can be used in a communication system, such as Code Division Multiple Access (CDMA), Global System for Mobile communication (GSM), North American Digital Cellular (NADC), Enhanced-Time Division Multiple Access (E-TDMA), Wideband CDMA (WCDMA), CDMA-2000, etc.

In the detailed description, those skilled in the art will appreciate that many variations and modifications can be made to the above exemplary embodiments without substantially departing from the principles of the inventive concept. Therefore, the above exemplary embodiments are used in a generic and descriptive sense only and not for purposes of limitation.

What is claimed is:

1. A multi-cluster processing system comprising:
a first cluster comprising a plurality of first-type cores;
a second cluster comprising a plurality of second-type cores; and
a control unit configured to monitor loads of the first-type cores and the second-type cores,
wherein when utilization of at least one of enabled first-type cores exceeds a predetermined threshold utilization of each of the first-type cores, the control unit enables at least one of disabled first-type cores in a first mode, and the control unit enables at least one of the disabled second-type cores and disables the first cluster in a second mode,
wherein an amount of computation per unit of time of each of the second-type cores is greater than an amount of computation per unit of time of each of the first-type cores.

2. The multi-cluster processing system of claim 1, wherein in the second mode, the control unit enables only a portion of disabled second-type cores and disables the first cluster.

3. The multi-cluster processing system of claim 1, wherein the first cluster and the second cluster are disposed in a single chip.

4. The multi-cluster processing system of claim 1, wherein when the multi-cluster processing system is in a low power mode, the control unit is in the first mode.

5. The multi-cluster processing system of claim 4, wherein the control unit receives a low power mode signal from a mode decision unit.

6. The multi-cluster processing system of claim 1, wherein when the multi-cluster processing system is in a high performance mode, the control unit is in the second mode.

7. The multi-cluster processing system of claim 6, wherein the control unit receives a high performance mode signal from a mode decision unit.

8. The multi-cluster processing system of claim 1, wherein in the second mode, the control unit enables a first number of the second-type cores in the second cluster and disables a second number of the first-type cores in the first cluster,
wherein the first number is less than the second number.

9. The multi-cluster processing system of claim 1, wherein in the second mode, the control unit enables a first number of the second-type cores in the second cluster and disables a second number of the first-type cores in the first cluster,
wherein the first number is equal to the second number.

10. The multi-cluster processing system of claim 1, wherein the control unit further monitors an idle time of each of the first-type cores and compares the idle time with the predetermined threshold time of each of the first-type cores, and wherein the control unit disables at least one of the first-type cores which has an idle time exceeding the predetermined threshold time.

11. The processing system of claim 1, wherein the first-type cores each perform a same amount of computation per unit of time, and the second-type cores each perform a same amount of computation per unit of time.

12. A method of operating a multi-cluster processing system, the method comprising:
providing a first cluster which comprises a plurality of first-type cores and a second cluster which comprises a plurality of second-type cores;
enabling at least one of disabled first-type cores when utilization of at least one of the enabled first-type cores exceeds a predetermined threshold utilization of each of the first-type cores and the multi-cluster processing system is in a first mode; and
disabling the first cluster and enabling at least one of disabled second-type cores when utilization of at least one of the enabled first-type cores exceeds the predetermined threshold utilization of each of the first-type cores and the multi-cluster processing system is in a second mode,
wherein an amount of computation per unit of time of each of the second-type cores is greater than an amount of computation per unit of time of each of the first-type cores.

13. The method of claim 12, further comprising:
monitoring an idle time of each of the first-type cores and comparing the idle time with the predetermined threshold time of each of the first-type cores,
disabling at least one of the first-type cores which has an idle time exceeding the predetermined threshold time.

14. The method of claim 12, wherein the first mode is a low power mode.

15. The method of claim 12, wherein the second mode is a high performance mode.

16. The method of claim 12, wherein the disabling the first cluster and enabling at least one of disabled second-type cores comprise disabling the first cluster and enabling only a portion of disabled second-type cores.

17. The method of claim 12, wherein the disabling the first cluster and enabling at least one of disabled second-type cores comprise disabling a second number of the first-type cores in the first cluster and enabling a first number of the second-type cores in the second cluster,
wherein the first number is less than the second number.

18. The method of claim 12, wherein the disabling the first cluster and enabling at least one of disabled second-type cores comprise disabling a second number of the first-type cores in the first cluster and enabling a first number of the second-type cores in the second cluster,
wherein the first number is equal to the second number.

* * * * *